United States Patent
Chuang et al.

(10) Patent No.: US 6,973,871 B1
(45) Date of Patent: Dec. 13, 2005

(54) ELECTRICAL TOASTER

(75) Inventors: Tsung-Yi Chuang, Kaohsiung (TW); Li-Hsuan Lin, Tainan (TW)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/895,798

(22) Filed: Jul. 21, 2004

(51) Int. Cl.[7] ............................................. A47J 37/08
(52) U.S. Cl. ..................... 99/327; 99/329 RT; 99/331; 99/339; 99/357; 99/385; 99/389; 99/391
(58) Field of Search .................. 99/326–333, 385–393, 99/339, 340, 357, 348, 237, 338; 219/492, 219/494, 497, 392, 395, 521–525, 385, 386, 219/518–520; 392/373–375, 337, 407, 433; 426/241, 466, 243, 523

(56) References Cited

U.S. PATENT DOCUMENTS

| | | | | |
|---|---|---|---|---|
| 2,659,295 A | * | 11/1953 | Soccoli | 99/339 |
| 2,851,943 A | * | 9/1958 | Smagula | 99/339 |
| 2,940,379 A | * | 6/1960 | Kenney et al. | 99/339 |
| 3,603,242 A | * | 9/1971 | Murphy, Sr. | 99/339 |
| 3,789,749 A | * | 2/1974 | Paaskesen | 99/391 |
| 4,216,372 A | * | 8/1980 | Huggler | 219/521 |
| 4,491,066 A | * | 1/1985 | Juriga et al. | 99/391 |
| 5,423,246 A | * | 6/1995 | McNair et al. | 99/334 |
| 5,458,052 A | * | 10/1995 | McNair et al. | 99/385 |
| 5,528,980 A | * | 6/1996 | McClean | 99/389 |
| 5,664,481 A | * | 9/1997 | Huggler | 99/328 |
| 6,244,166 B1 | * | 6/2001 | Lebron | 99/342 |
| 6,581,512 B1 | * | 6/2003 | Mauffrey et al. | 99/389 |

* cited by examiner

Primary Examiner—Timothy F. Simone
(74) Attorney, Agent, or Firm—Ladas & Parry LLP

(57) ABSTRACT

An electrical toaster includes a case unit having a laterally extending supporting wall and defining a heating chamber that is disposed below the supporting wall, at least a lower slot that is formed in the supporting wall and that is in spatial communication with the heating chamber, and a warming chamber that is disposed above the supporting wall and that is in fluid communication with the lower slot. An electrical heating unit is disposed in the heating chamber. A cover is mounted removably on the case unit for covering at least a top side of the warming chamber.

18 Claims, 10 Drawing Sheets

ELECTRICAL TOASTER

BACKGROUND OF THE INVENTION

1. Field of the Invention

This invention relates to an electrical toaster, more particularly to an electrical toaster including a heating chamber and a warming chamber disposed above and separated from the heating chamber through a supporting wall.

2. Description of the Related Art

Referring to FIG. 1, a conventional electrical toaster that includes a casing 11 that defines two heating slots 112 for receiving slices of bread therein and that has a top end 111, a heating unit (not shown) that is disposed in the casing 11 adjacent to the heating slots 112, a bread-supporting rack 13 that is mounted removably on the top end 111 of the casing 11 for supporting a piece of bread thereon, an actuating lever 121 that is associated with the heating unit and that is pressable for actuating the heating unit, and a temperature controller (not shown) associated with the actuating lever 121 and the heating unit for controlling the amount of heat generated by the heating unit and having a temperature control knob 123 for setting a desired heating temperature to be raised in the casing 11.

The aforesaid conventional electrical toaster is disadvantageous in that uniform heating of the bread on the bread-supporting rack 13 cannot be achieved. Moreover, the heating unit normally includes two heating elements (not shown) which are actuated for heating the slices of bread in the heating slots 112 when the actuating lever 121 is pressed. However, in case of warming the bread on the bread-supporting rack 13, the heat generated by the two heating elements may be too much. As a consequence, scorching of the bottom side of the bread is likely to occur.

SUMMARY OF THE INVENTION

Therefore, the object of the present invention is to provide an electrical toaster that is capable of overcoming the aforesaid drawbacks associated with the prior art.

According to one aspect of the present invention, there is provided an electrical toaster that comprises: a case unit having a laterally extending supporting wall and defining a heating chamber that is disposed below the supporting wall, at least a lower slot that is formed in the supporting wall, that is in spatial communication with the heating chamber, and that is adapted to permit insertion of a piece of bread therethrough and into the heating chamber, and a warming chamber that is disposed above the supporting wall, that is in fluid communication with the lower slot, and that is adapted to receive bread therein; an electrical heating unit disposed in the heating chamber; and a cover that is mounted removably on the case unit for covering at least a top side of the warming chamber.

According to another aspect of the present invention, there is provided an electrical toaster that comprises: a case unit having a laterally extending supporting wall and defining a heating chamber that is disposed below the supporting wall, at least a lower slot that is formed in the supporting wall, that is in spatial communication with the heating chamber, and that is adapted to permit insertion of a piece of bread therethrough and into the heating chamber, and a warming chamber that is disposed above the supporting wall, that is in fluid communication with the lower slot, and that is adapted to receive bread therein, the supporting wall being formed with a button-receiving hole; an electrical heating unit disposed in the heating chamber for generating heat when actuated; a temperature controller associated with the heating unit to control actuation of the heating unit and the amount of heat generated by the heating unit; a button-operated mechanism associated with the temperature controller and including a button that is received in the button-receiving hole and that is pressable for actuating the heating unit through the temperature controller to generate a desired amount of heat; and a bread-supporting tray mounted removably on the supporting wall within the warming chamber. The bread-supporting tray is formed with a plurality of apertures that are in fluid communication with the lower slot and the warming chamber, and has an actuation protrusion that projects downwardly therefrom into the button-receiving hole to press the button such that the heating unit is actuated through the temperature controller when the bread-supporting tray is mounted on the supporting wall.

BRIEF DESCRIPTION OF THE DRAWINGS

In drawings which illustrate embodiments of the invention.

DETAILED DESCRIPTION OF THE PREFERRED EMBODIMENTS

Figure 1:
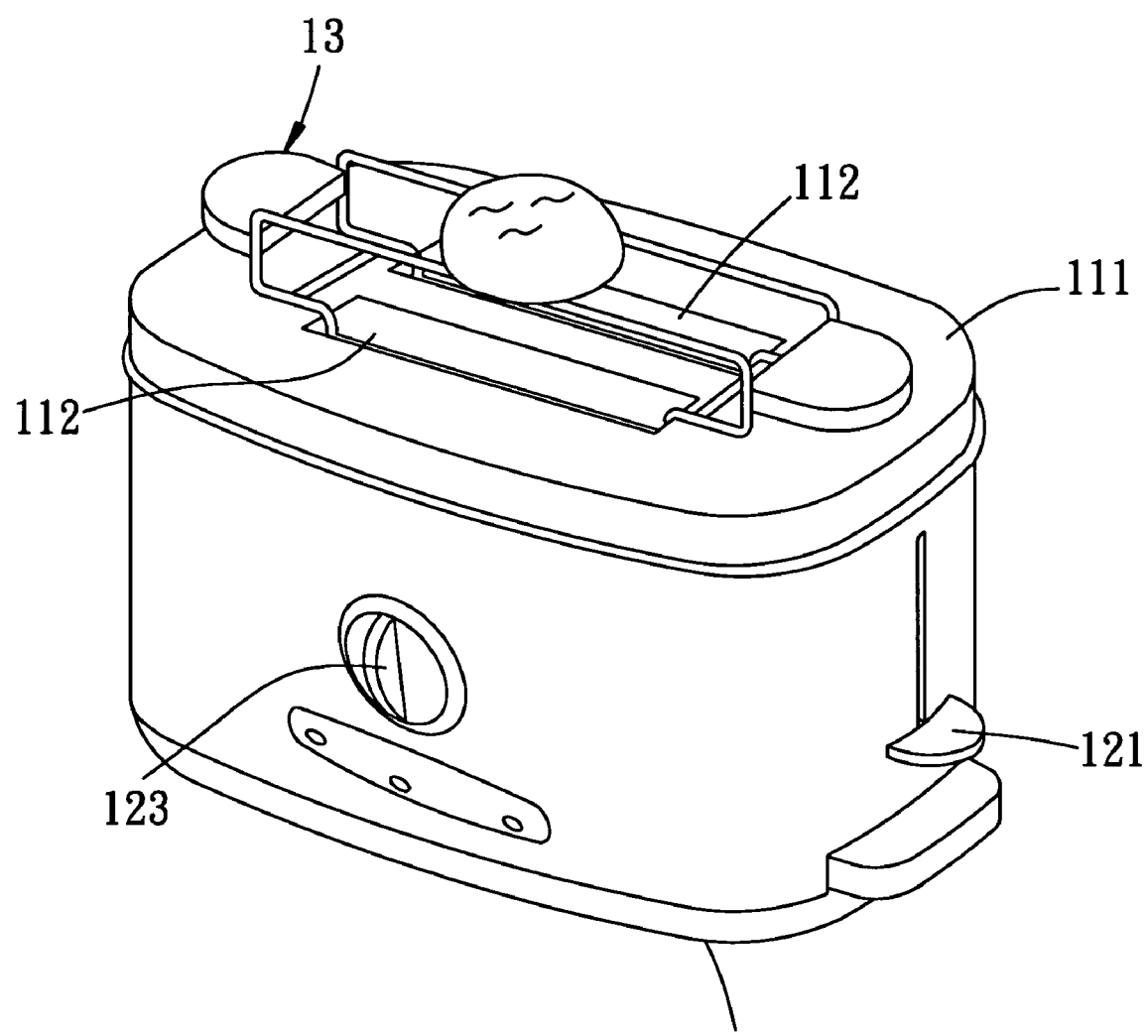
FIG. 1 is a perspective view of a conventional electrical toaster.

For the sake of brevity, like elements are denoted by the same reference numerals throughout the disclosure.

FIGS. 2 to 7 illustrate the first preferred embodiment of an electrical toaster according to this invention. The electrical toaster includes: a case unit 100 having a laterally extending supporting wall 21 and defining a heating chamber 20 that is disposed below the supporting wall 21, at least a lower slot 25 that is formed in the supporting wall 21 (two lower slots 25 are formed in the supporting wall 21 in this embodiment), that is in spatial communication with the heating chamber 20, and that is adapted to permit insertion of a flat piece of bread 200 (see FIG. 6, the bread 200 can be toast or bagel) therethrough and into the heating chamber 20, and a warming chamber 43 that is disposed above the supporting wall 21, that is in fluid communication with the lower slot 25, and that is adapted to receive the non-flat pieces of bread 300 (see FIG. 7, the bread 300 can be buns) therein; an electrical heating unit 32' (see FIG. 4) disposed in the heating chamber 20; and a cover 5 that is mounted removably on the case unit 100 for covering at least a top side of the warming chamber 43.

In this embodiment, the case unit 100 includes a main casing 2 and a warming casing 4. The main casing 2 has a peripheral wall 24 that extends downwardly and transversely from the supporting wall 21 to confine the heating chamber 20. The warming casing 4 has a laterally extending base wall 41 that is mounted removably on the supporting wall 21, a peripheral wall 42 that extends upwardly and transversely from a periphery of the base wall 41 to confine the warming chamber 43, and a top flange 422 that extends outwardly and laterally from the peripheral wall 42 of the warming casing 4. The cover 5 has a laterally extending top wall 51 that is disposed above and that is vertically aligned with the base wall 41, and a peripheral wall 52 that extends downwardly and transversely from the top wall 51 of the cover 5 and that is seated on the top flange 422 of the warming casing 4.

The main casing 2 further has a top rim 22 that is formed on and that extends upwardly and transversely from the supporting wall 21 to define a receiving space 23 for surrounding a portion of the peripheral wall 42 of the warming casing 4 when the base wall 41 of the warming casing 4 is mounted on the supporting wall 21. The base wall 41 of the warming casing 4 is formed with at least an upper slot 411 (two upper slots 411 are formed in the base wall 41 in this embodiment) that is vertically aligned with and that is in fluid communication with the lower slot 25 in the supporting wall 21.

The supporting wall 21 is formed with a plurality of insertion holes 211. The base wall 41 of the warming casing 4 is formed with a plurality of spacing protrusions 413 (see FIG. 3) that are snugly and respectively inserted into the insertion holes 211 so as to permit mounting of the warming casing 4 on the supporting wall 21 and so as to space apart the supporting wall 21 and the base wall 41 from each other. The base wall 41 of the warming casing 4 is formed with a plurality of spacing bulges 412 that project therefrom into the warming chamber 43 and that are adapted to support the bread 300 thereon and to space apart the bread 300 from the base wall 41. The peripheral wall 42 of the warming casing 4 is formed with a plurality of heat flow passages 421 that are in fluid communication with the warming chamber 43 and the receiving space 23 confined by the top rim 22 of the main casing 2.

The top wall 51 of the cover 5 has a grip 512 that projects upwardly therefrom, and is formed with at least a vent hole 511 that is in fluid communication with the warming chamber 43. The top flange 422 of the warming casing 4 has a top rim 423 that is surrounded by the peripheral wall 52 of the cover 5 so as to prevent undesired lateral movement of the cover 5 when the cover 5 is seated on the top flange 422 of the warming casing 4.

The top flange 422 of the warming casing 4 has two opposite ends. The warming casing 4 further has opposite left and right handles 44, 45 that project laterally and respectively from the opposite ends of the top flange 422 of the warming casing 4.

The base wall 41 of the warming casing 4 is further formed with a retainer 46 that projects downwardly therefrom toward the supporting wall 21. The left handle 44 is formed with a retaining slot 441. The electrical toaster further includes a bent knife 6, such as a butter knife, that is mounted removably on the warming casing 4, and that has a blade portion 61 extending through the retainer 46, and a handle portion 62 that is disposed above the blade portion 61 and that extends through the retaining slot 441 when the bent knife 6 is mounted on the warming casing 4 for heating.

Figure 2:
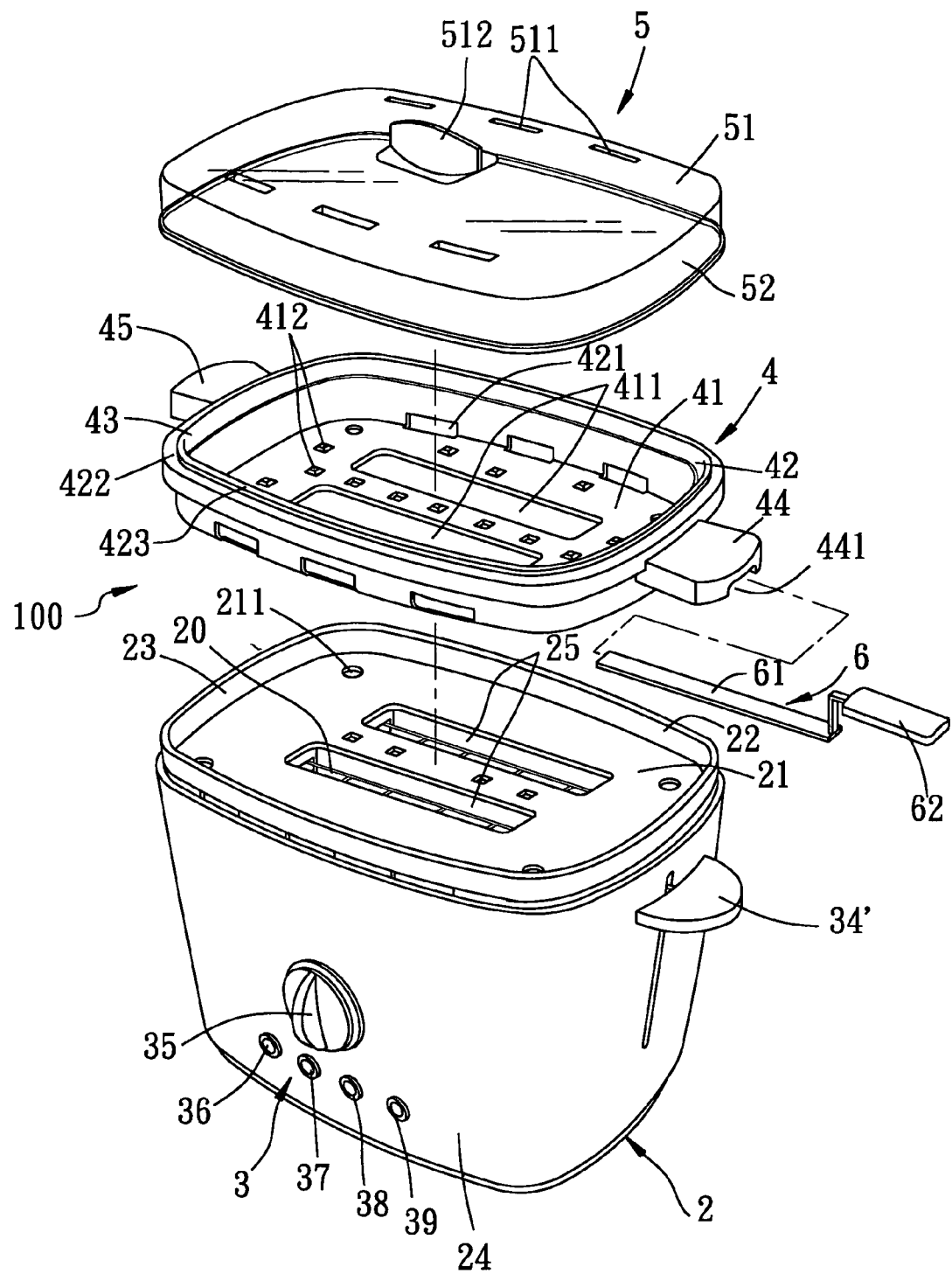
FIG. 2 is a partly exploded, perspective view of the first preferred embodiment of an electrical toaster according to this invention.
Figure 3:
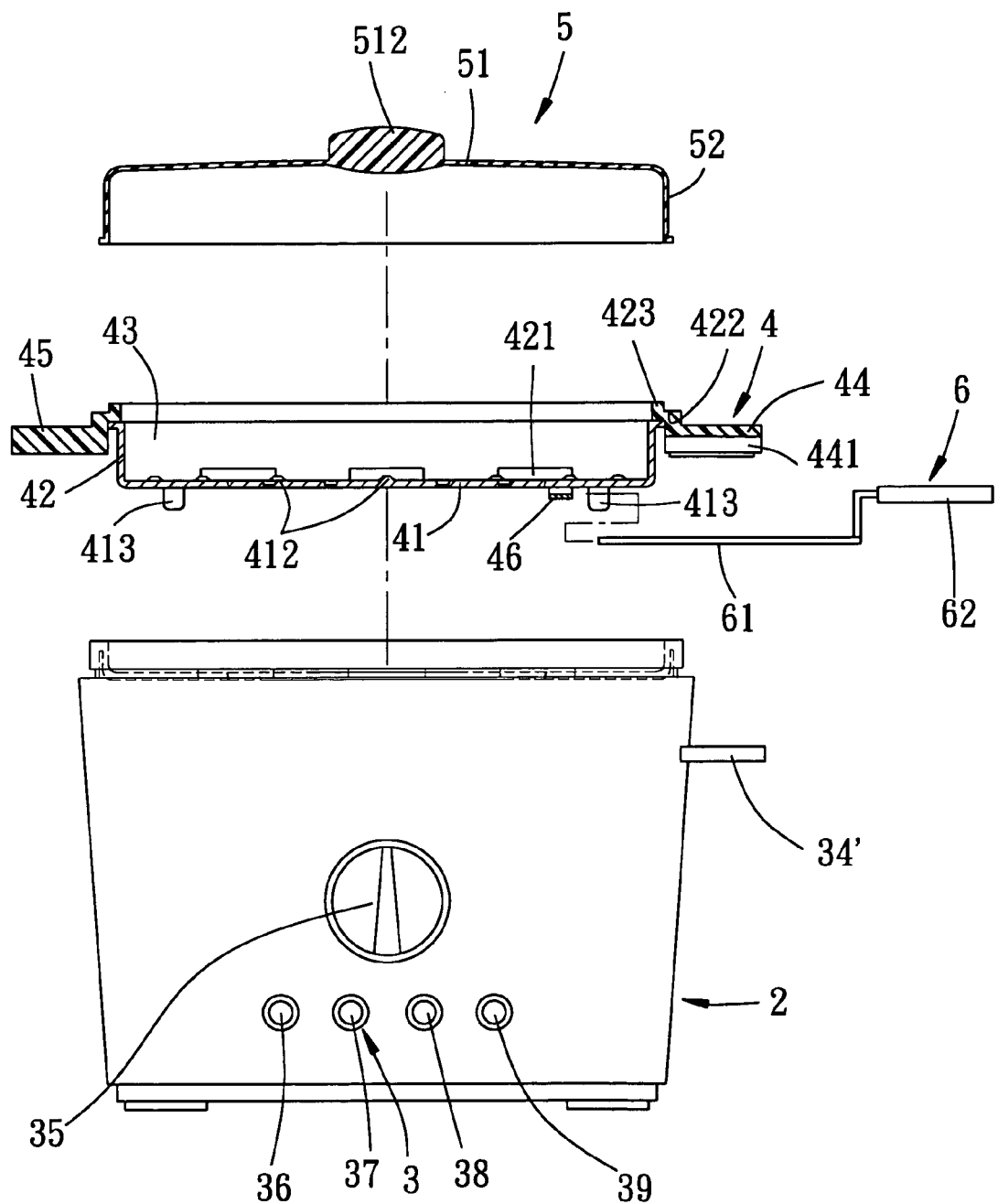
FIG. 3 is a partly exploded, partly sectional, schematic view of the first preferred embodiment.
Figure 4:
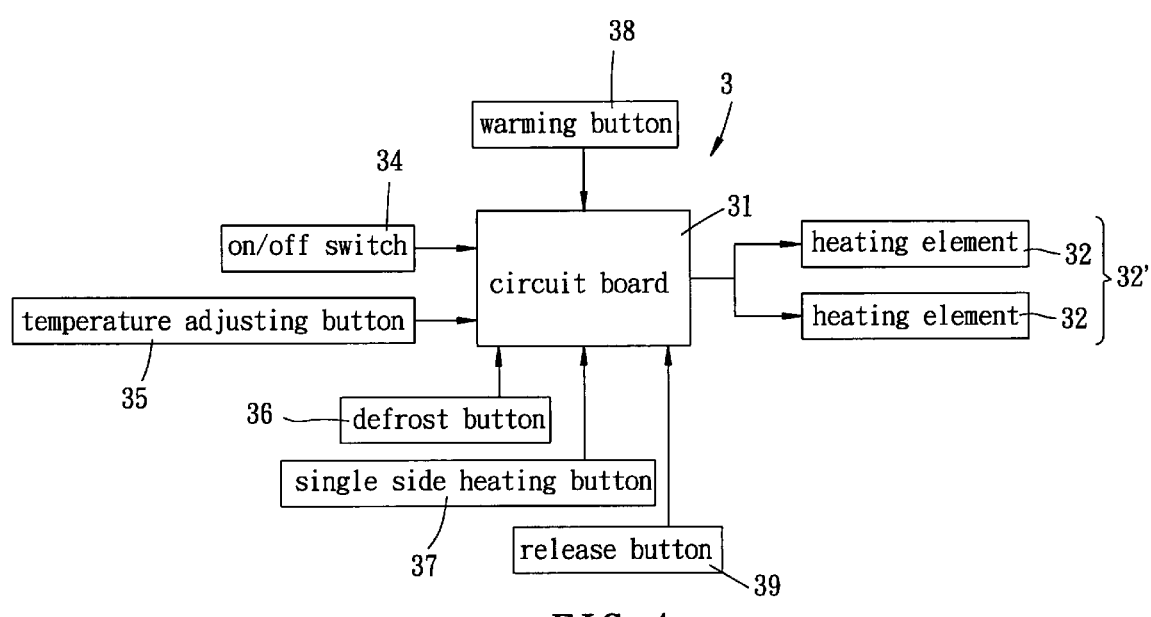
FIG. 4 is a block diagram to illustrate how two heating elements are actuated and controlled through a temperature controller of the electrical toaster of the first preferred embodiment.
Figure 5:
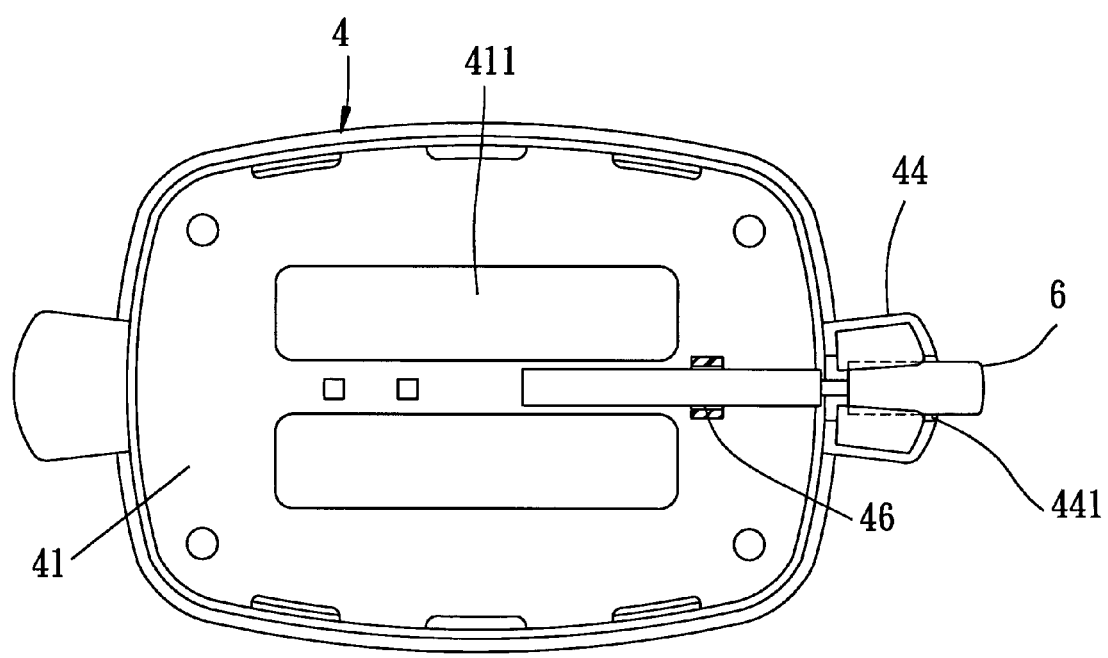
FIG. 5 is a fragmentary bottom view of the electrical toaster of the first preferred embodiment.
Figure 6:
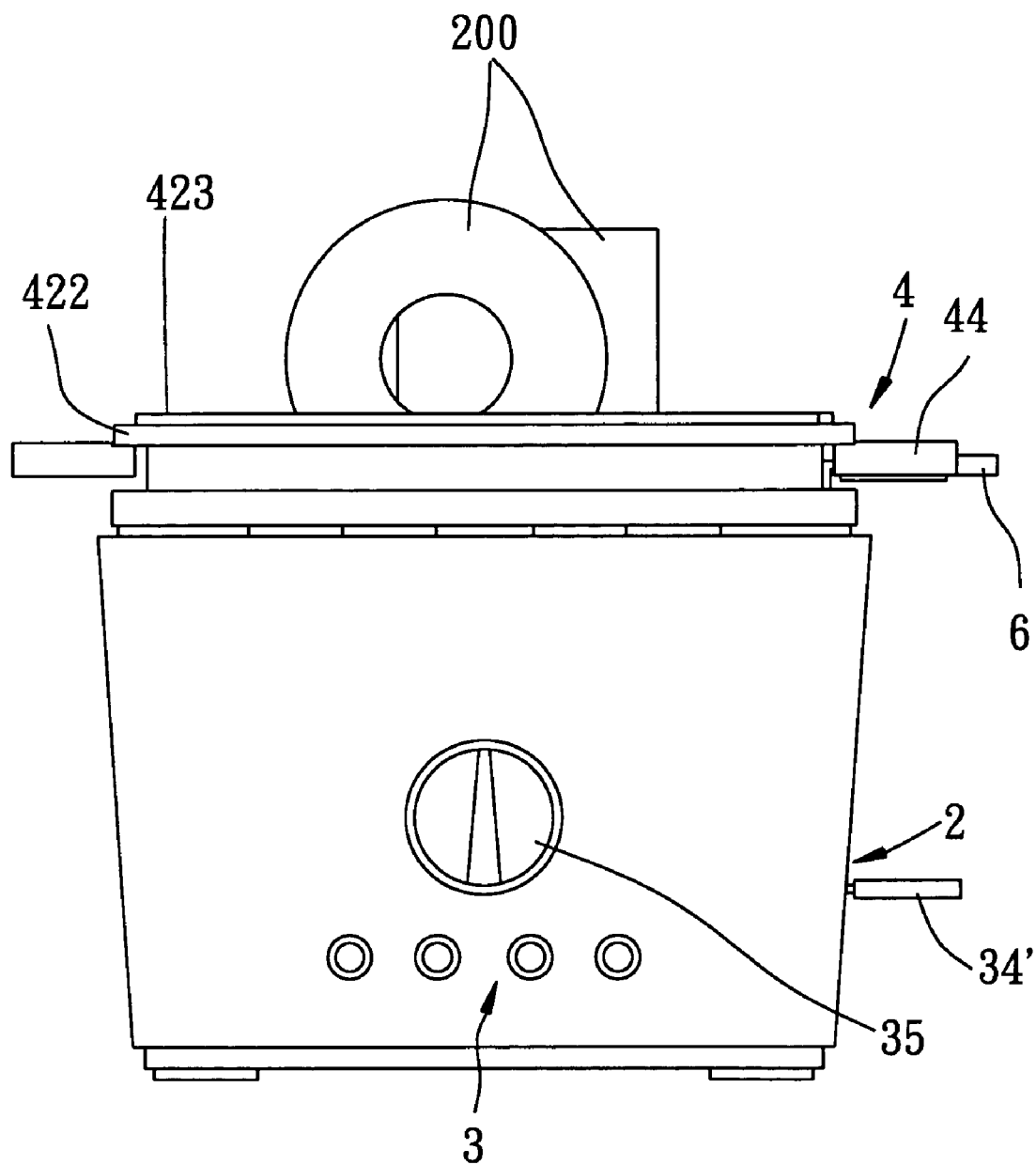
FIG. 6 is a fragmentary assembled side view of the electrical toaster of the first preferred embodiment.
Figure 7:
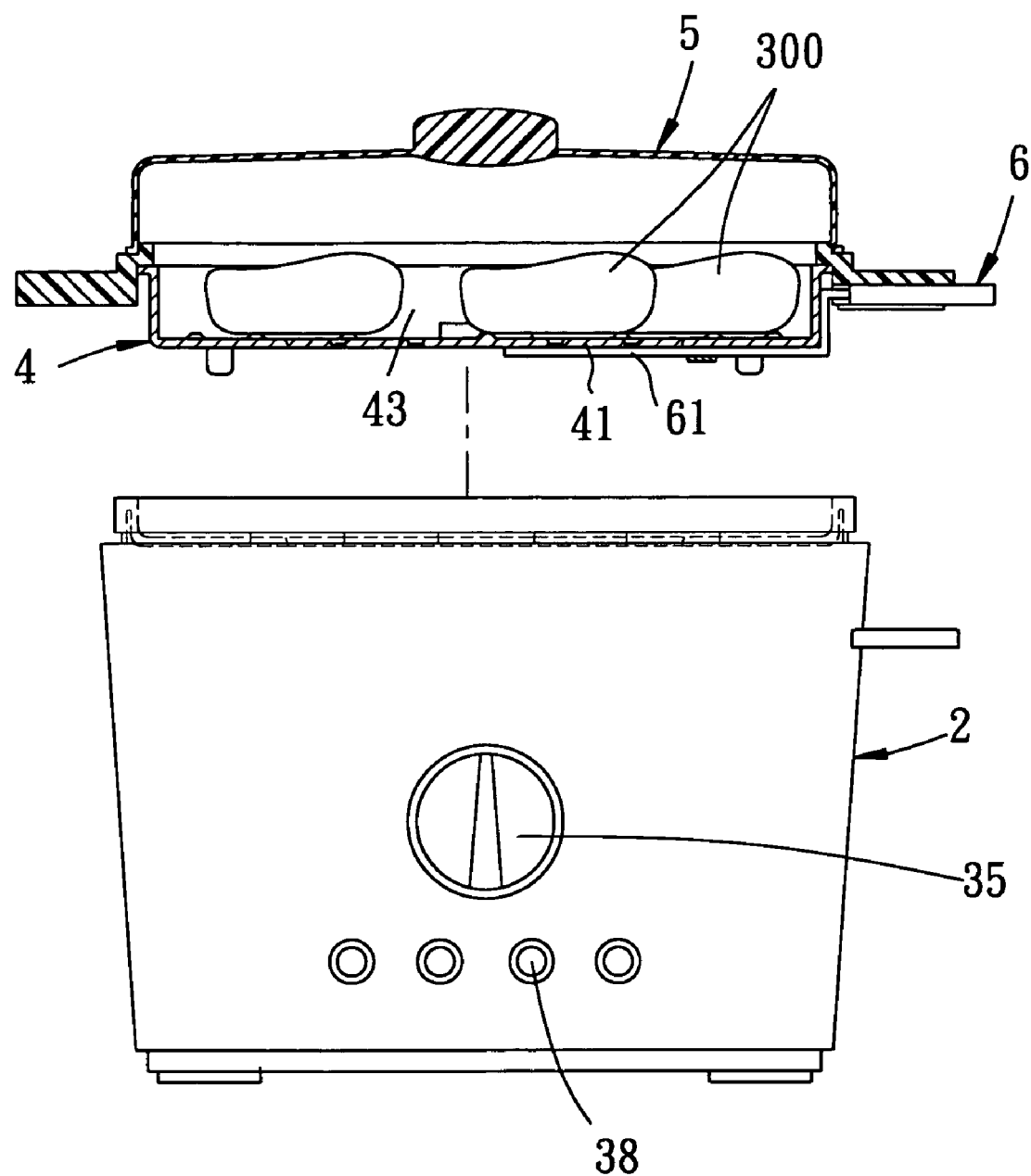
FIG. 7 is a partly exploded, partly sectional, schematic view to illustrate how pieces of bread are retained in a warming casing of the electrical toaster of the first preferred embodiment.

Referring now to FIG. 4, in combination with FIG. 2, the heating unit 32' includes two heating elements 32 that are actuated and that are controlled by a temperature controller 3. The temperature controller 3 includes a circuit board 31 connected electrically to the heating elements 32, and button-operated mechanisms 35, 36, 37, 38, 39 that are associated with the circuit board 31 for controlling the heat generated by the heating elements 32 and that respectively provide temperature adjusting function, defrost function, single side heating function, warming function, and release function. In addition, a known lever-operated mechanism 34 is associated with the circuit board 31, serves as an on/off switch, and includes a lever 34' that is pressable to a lower position for moving the bread 200 (see FIG. 6) into the heating chamber 20 and for actuating the heating elements 32. The button-operated mechanism 38, when pressed, actuates one of the heating elements 32 for warming the bread 300 in the warming chamber 43.

Figure 8:
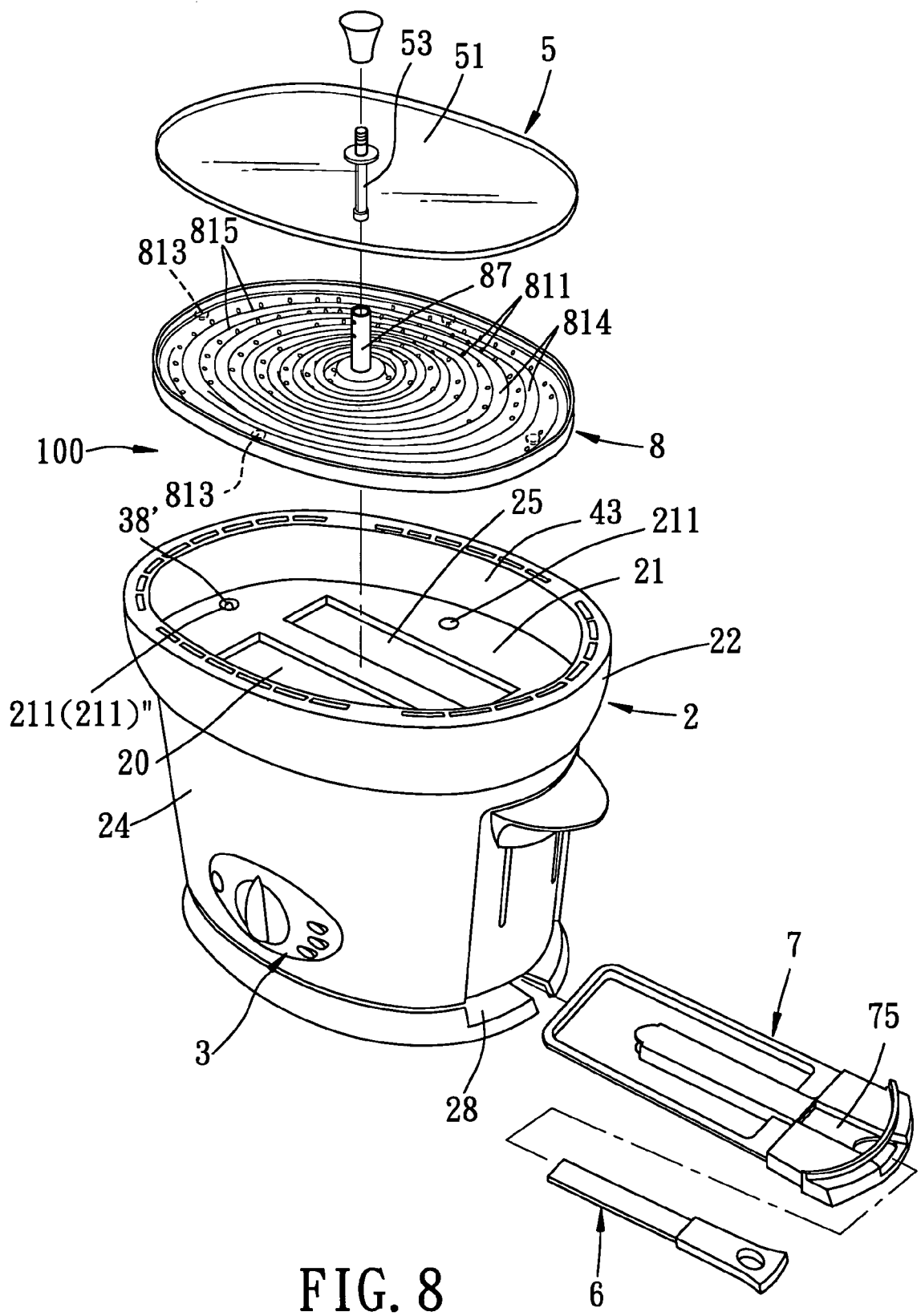
FIG. 8 is a partly exploded, perspective view of the second preferred embodiment of the electrical toaster according to this invention.
Figure 9:
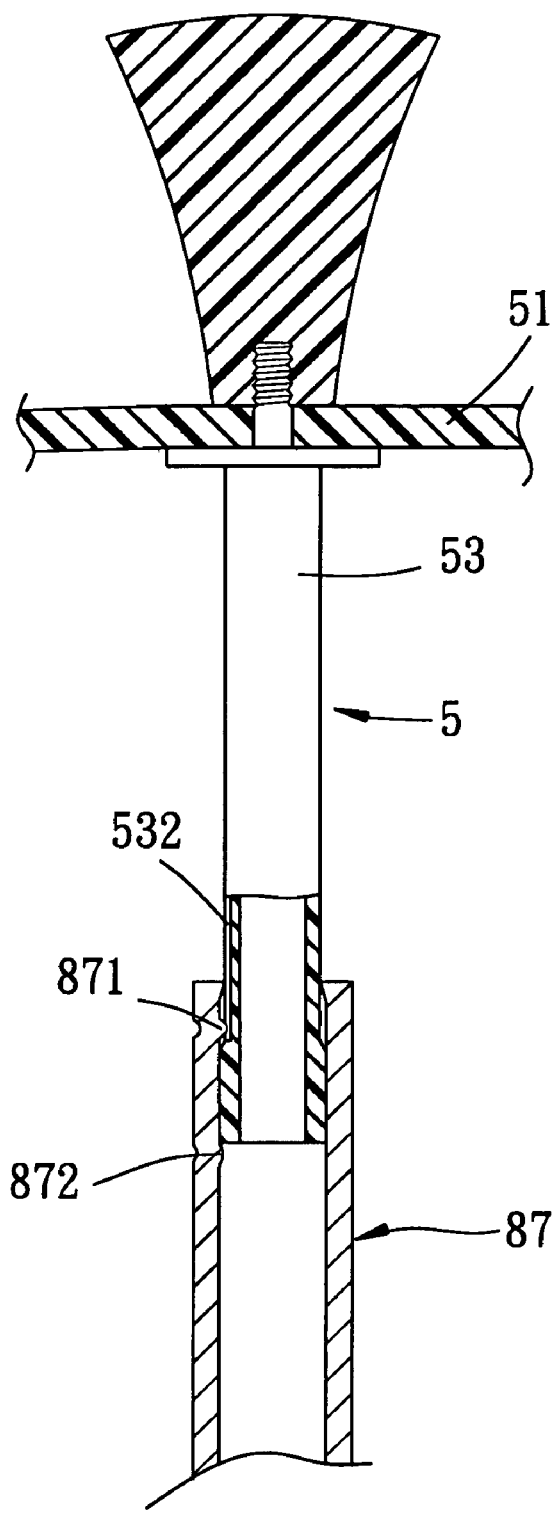
FIG. 9 is a fragmentary sectional view to illustrate how a cover is mounted on a bread-supporting tray of the electrical toaster of the second preferred embodiment.
Figure 10:
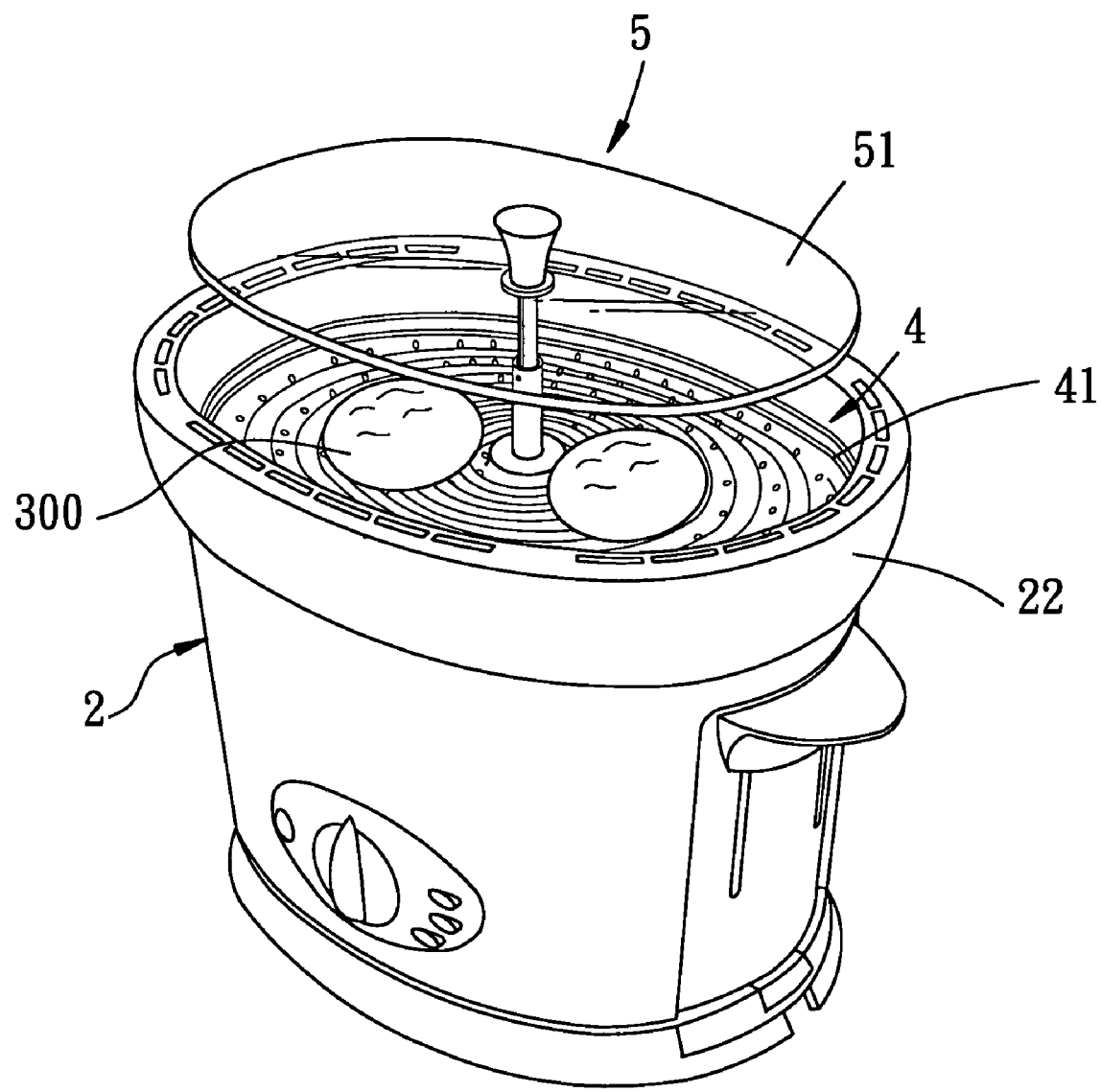
FIG. 10 is an assembled perspective view of the electrical toaster of the second preferred embodiment.

FIGS. 8 to 10 illustrate the second preferred embodiment of the electrical toaster according to this invention. The electrical toaster of this embodiment differs from the previous embodiment in that the case unit 100 includes a main casing 2 and a bread-supporting tray 8, and that the top rim 22 of the main casing 2 defines the warming chamber 43. The bread-supporting tray 8 is mounted removably on the supporting wall 21, is formed with a plurality of apertures 811 that are in fluid communication with the lower slot 25, has a center, and is corrugated to form a plurality of alternately disposed grooves and ridges 814, 815 around the center.

The supporting wall 21 is formed with a plurality of insertion holes 211. The bread-supporting tray 8 is formed with a plurality of spacing protrusions 813 that extend downwardly therefrom and snugly into the insertion holes 211 so as to space apart the supporting wall 21 and the bread-supporting tray 8 from each other.

The peripheral wall 24 of the main casing 2 has a bottom end, and is formed with a tray-insertion slot 28 that is disposed adjacent to the bottom end and that is in spatial communication with the heating chamber 20. A crumb-collecting tray 7 is insertable into the heating chamber 20 through the tray-insertion slot 28. The crumb-collecting tray 7 is formed with a knife-retaining slot 75 that is disposed in the heating chamber 20 when the crumb-collecting tray 7 is inserted into the heating chamber 20. A butter knife 6 is insertable into the knife-retaining slot 75 for heating when the crumb-collecting tray 7 is inserted into the heating chamber 20.

The bread-supporting tray 8 is formed with a hollow post 87 that is disposed at the center and that extends upwardly therefrom. The cover 5 is disposed above the top rim 22 of the main casing 2, and includes a cover body 51 and a rod 53 that extends from the cover body 51 into the post 87 and that is telescopically movable relative to the post 87 so as to permit adjustment of the height of the cover 5 relative to the top rim 22 and so as to accommodate different sizes of the bread 300 in the warming chamber 43. The rod 53 is formed with an elongated guiding groove 532. The post 87 is formed with an inner guiding protrusion 871 that extends into the guiding groove 532 so as to guide telescopic movement of the rod 53 relative to the post 87, and an inner positioning protrusion 872 that is disposed below the inner guiding protrusion 871 and that engages releasably the rod 53 for positioning the cover body 51 at a desired height relative to the bread-supporting tray 8.

The button-operated mechanism 38 includes a button 38'. One of the insertion holes 211 in the supporting wall 21 defines a button-receiving hole 211'. The button 38' is received in the button-receiving hole 211', and is pressed to a lower position by the respective spacing protrusion 813 upon mounting of the bread-supporting tray 8 on the supporting wall 21, thereby enabling actuation of one of the heating elements 32 of the heating unit 32' (see FIG. 4) through the temperature controller 3 to generate a desired amount of heat for warming the bread 300 in the warming chamber 43.

With the inclusion of the warming chamber 43 and the cover 5 in the electrical toaster of this invention, the aforesaid drawbacks of the prior art can be eliminated.

With the invention thus explained, it is apparent that various modifications and variations can be made without departing from the spirit of the present invention.

We claim:

1. An electrical toaster comprising:
   a case unit having a laterally extending supporting wall and defining a heating chamber that is disposed below said supporting wall, at least a lower slot that is formed in said supporting wall, that is in spatial communication with said heating chamber, and that is adapted to permit insertion of a piece of bread therethrough and into said heating chamber, and a warming chamber that is disposed above said supporting wall, that is in fluid communication with said lower slot, and that is adapted to receive bread therein;
   an electrical heating unit disposed in said heating chamber; and
   a cover that is mounted removably on said case unit for covering at least a top side of said warming chamber;
   wherein said case unit includes a main casing and a warming casing, said main casing having a peripheral wall that extends downwardly and transversely from said supporting wall to confine said heating chamber, said warming casing having a laterally extending base wall that is mounted removably on said supporting wall, a peripheral wall that extends upwardly and transversely from a periphery of said base wall to confine said warming chamber, and a top flange that extends outwardly and laterally from said peripheral wall of said warming casing, said cover having a laterally extending top wall that is disposed above and that is vertically aligned with said base wall, and a peripheral wall that extends downwardly and transversely from said top wall of said cover and that is seated on said top flange of said warming casing.

2. The electrical toaster of claim 1, wherein said main casing further has a top rim that is formed on and that extends upwardly and transversely from said supporting wall to define a receiving space for surrounding a portion of said peripheral wall of said warming casing when said base wall of said warming casing is mounted on said supporting wall.

3. The electrical toaster of claim 1, wherein said base wall of said warming casing is formed with at least an upper slot that is vertically aligned with and that is in fluid communication with said lower slot in said supporting wall.

4. The electrical toaster of claim 1, wherein said supporting wall is formed with a plurality of insertion holes, said base wall of said warming casing being formed with a plurality of spacing protrusions that are snugly and respectively inserted into said insertion holes so as to permit mounting of said warming casing on said supporting wall and so as to space apart said supporting wall and said base wall from each other.

5. The electrical toaster of claim 1, wherein said base wall of said warming casing is formed with a plurality of spacing bulges that project therefrom into said warming chamber and that are adapted to support the bread thereon and to space apart the bread from said base wall.

6. The electrical toaster of claim 1, wherein said top wall of said cover has a grip that projects upwardly therefrom, and is formed with at least a vent hole that is in fluid communication with said warming chamber.

7. The electrical toaster of claim 1, wherein said peripheral wall of said warming casing is formed with a plurality of heat flow passages that are in fluid communication with said warming chamber.

8. The electrical toaster of claim 1, wherein said top flange of said warming casing has a top rim that is surrounded by said peripheral wall of said cover so as to prevent undesired lateral movement of said cover when said cover is seated on said top flange of said warming casing.

9. The electrical toaster of claim 1, wherein said top flange of said warming casing has two opposite ends, said warming casing further having two opposite handles that project laterally and respectively from said opposite ends of said top flange of said warming casing.

10. The electrical toaster of claim 9, wherein said base well of said warming casing is further formed with a retainer that projects downwardly therefrom toward said supporting wall, one of said handles being formed with a retaining slot, said electrical toaster further comprising a bent knife that is mounted removably on said warming casing, and that has a blade portion extending through said retainer, and a handle portion that is disposed above said blade portion and that extends through said retaining slot when said bent knife is mounted on said warming casing.

11. An electrical toaster comprising:
    a case unit having a laterally extending supporting wall and defining a heating chamber that is disposed below said supporting wall, at least a lower slot that is formed in said supporting wall, that is in spatial communication with said heating chamber, and that is adapted to permit insertion of a piece of bread therethrough and into said heating chamber, and a warming chamber that is disposed above said supporting wall, that is in fluid communication with said lower slot, and that is adapted to receive bread therein;
    an electrical heating unit disposed in said heating chamber; and
    a cover that is mounted removably on said case unit for covering at least a top side of said warming chamber;
    wherein said case unit includes a main casing having a peripheral wall that confines said heating chamber and that has a top end, said supporting wall being formed on said top end of said peripheral wall, said main casing further having a top rim that is formed on and that extends upwardly and transversely from said supporting wall to define said warming chamber, said case unit further including a bread-supporting tray that is mounted removably on said supporting wall and that is formed with a plurality of apertures that are in fluid communication with said lower slot.

12. The electrical toaster of claim 11, wherein said bread-supporting tray has a center, and is corrugated to form a plurality of alternately disposed grooves and ridges around said center.

13. The electrical toaster of claim 11, wherein said supporting wall is formed with a plurality of insertion holes, said bread-supporting tray being formed with a plurality of spacing protrusions that extend downwardly therefrom and snugly into said insertion holes so as to space apart said supporting wall and said bread-supporting tray from each other.

14. The electrical toaster of claim 11, wherein said peripheral wall has a bottom end, and is formed with a tray-insertion slot that is disposed adjacent to said bottom end and that is in spatial communication with said heating chamber, said electrical toaster further comprising a crumb-collecting tray that is insertable into said heating chamber through said tray-insertion slot.

15. The electrical toaster of claim 14, wherein said crumb-collecting tray is formed with a knife-retaining slot that is disposed in said heating chamber when said crumb-collecting tray is inserted into said heating chamber, said electrical toaster further comprising a knife that is insertable into said knife-retaining slot.

16. The electrical toaster of claim 11, wherein said bread-supporting tray has a center, and is formed with a hollow post that is disposed at said center and that extends upwardly therefrom, said cover being disposed above said top rim and including a cover body and a rod that extends from said cover body into said post and that is telescopically movable relative to said post so as to permit adjustment of the height of said cover relative to said top rim.

17. An electrical toaster comprising:
a case unit having a laterally extending supporting wall and defining a heating chamber that is disposed below said supporting wall, at least a lower slot that is formed in said supporting wall, that is in spatial communication with said heating chamber, and that is adapted to permit insertion of a piece of bread therethrough and into said heating chamber, and a warming chamber that is disposed above said supporting wall, that is in fluid communication with said lower slot, and that is adapted to receive bread therein, said supporting wall being formed with a button-receiving hole;

an electrical heating unit disposed in said heating chamber for generating heat when actuated;

a temperature controller associated with said heating unit to control actuation of said heating unit and the amount of heat generated by said heating unit;

a button-operated mechanism associated with said temperature controller and including a button that is received in said button-receiving hole and that is pressable for actuating said heating unit through said temperature controller to generate a desired amount of heat; and a bread-supporting tray mounted removably on said supporting wall within said warming chamber, said bread-supporting tray being formed with at least an aperture that are in fluid communication with said lower slot and said warming chamber, and having an actuation protrusion that projects downwardly therefrom into said button-receiving hole to press said button such that said heating unit is actuated through said temperature controller when said bread-supporting tray is mounted on said supporting wall.

18. The electrical toaster of claim 17, wherein said heating unit includes a pair of heating elements that are electrically connected to said temperature controller, one of said heating element being actuated when said button is pressed.

* * * * *